(12) United States Patent
Tetzner et al.

(10) Patent No.: US 12,554,337 B2
(45) Date of Patent: Feb. 17, 2026

(54) WIRELESS KEYBOARD

(71) Applicant: Voyetra Turtle Beach, Inc., White Plains, NY (US)

(72) Inventors: Thaddaeus Erasmus Georg Richard Tetzner, Hamburg (DE); Chih Wei Hung, New Taipei (TW); Ying-Chin Cho, New Taipei (TW)

(73) Assignee: Voyetra Turtle Beach, Inc., San Diego, CA (US)

( * ) Notice: Subject to any disclaimer, the term of this patent is extended or adjusted under 35 U.S.C. 154(b) by 0 days.

(21) Appl. No.: 18/725,481

(22) PCT Filed: Dec. 19, 2022

(86) PCT No.: PCT/US2022/081910
§ 371 (c)(1),
(2) Date: Jun. 28, 2024

(87) PCT Pub. No.: WO2023/129828
PCT Pub. Date: Jul. 6, 2023

(65) Prior Publication Data
US 2025/0068257 A1     Feb. 27, 2025

(30) Foreign Application Priority Data

Dec. 29, 2021 (TW) .................................. 110215573
Dec. 30, 2021 (CN) .......................... 202123375177.4

(51) Int. Cl.
*G06F 3/023* (2006.01)
*G06F 1/3234* (2019.01)

(52) U.S. Cl.
CPC .......... *G06F 3/0231* (2013.01); *G06F 1/3271* (2013.01)

(58) Field of Classification Search
CPC ........ G06F 3/023; G06F 3/0231; H01H 13/70
See application file for complete search history.

(56) References Cited

U.S. PATENT DOCUMENTS

| | | | |
|---|---|---|---|
| 9,405,380 B2 * | 8/2016 | Knighton | .............. G06F 3/0231 |
| 2005/0237304 A1 | 10/2005 | Anandakumar et al. | |
| 2007/0296701 A1 | 12/2007 | Pope et al. | |
| 2012/0212319 A1 * | 8/2012 | Ling | ..................... G06F 1/3231 |
| | | | 340/3.1 |
| 2014/0364218 A1 | 12/2014 | Holmgren et al. | |
| 2021/0240254 A1 * | 8/2021 | Hamlin | ................. G06F 1/1605 |
| 2022/0084279 A1 * | 3/2022 | Lindmeier | .............. G06T 15/20 |

* cited by examiner

*Primary Examiner* — Calvin C Ma
(74) *Attorney, Agent, or Firm* — Sheppard Mullin Richter & Hampton LLP

(57) ABSTRACT

A wireless keyboard, comprising a body, several keys, a first detection unit, a second detection unit and a control unit. The several keys are disposed on the body. The first detection unit is disposed on one side of the body. The second detection unit is disposed on the other side of the body corresponding to the first detection unit. The first detection unit and the second detection unit jointly detect a feedback signal therebetween. When the feedback signal corresponds to an activation signal, the control unit activates the wireless keyboard. In some implementations, the wireless keyboard can save power, and does not require users to switch on/off the power supply manually, thereby achieving the purpose of facilitating life.

10 Claims, 3 Drawing Sheets

WIRELESS KEYBOARD

CROSS-REFERENCE TO RELATED APPLICATIONS

This application is a National Phase application under 35 U.S.C. § 371 of PCT Application No. PCT/US2022/081910, filed Dec. 19, 2022, which application claims the benefit of Taiwan Patent Application No. 110215573, filed Dec. 29, 2021 (which issued as Taiwan Patent No. M629355 on Jul. 11, 2022), and Chinese Patent Application No. 202123375177.4, filed Dec. 30, 2021 (which issued as Chinese Patent No. ZL 202123375177.4 on Aug. 9, 2022), which are hereby incorporated herein by reference in their entirety.

TECHNICAL FIELD

The present utility model relates to a wireless keyboard, and in particular to a wireless keyboard with a wake-up function.

BACKGROUND ART

With the advent of the digital age, people are increasingly dependent on digital information. Not only personal documents, photos, audio and video, but even important assets such as personal wealth have entered the stage of comprehensive digitalization. In addition to the advantages of convenient transmission, storage or processing, digital information can also have more targeted functions and development applications according to different digital devices. For example, a standard computer keyboard commonly used in the information industry and a financial password keyboard commonly used in the financial industry are some of the devices used to process digital information. Recently, with advancements in science and technology, data transmission between these input devices and computers has advanced to use wireless transmission. In this way, users can be freed from the constraints of cables, and the use distances between these input devices and the computer hosts can be increased.

However, for convenience and portability, the existing general wireless keyboards are usually not configured with batteries that are too large or heavy. Therefore, under the constraints of volume and weight, when the general wireless keyboards are used for a long time, a problem of insufficient power supply duration will be highlighted. If a detachable battery or a manual power switch is used to manage the power, it will increase the troubles of users, resulting in various inconveniences in life.

For this reason, the matter of how to design a wireless keyboard capable of saving power is an important subject studied by the creator of this case.

SUMMARY OF THE UTILITY MODEL

An objective of the present utility model is to provide a wireless keyboard which can save power and does not require users to switch on/off the power supply manually, thereby achieving the purpose of facilitating life.

In order to achieve the aforementioned objective, a wireless keyboard proposed by the present utility model comprises a body, several keys, a first detection unit, a second detection unit and a control unit. The several keys are disposed on the body. The first detection unit is disposed on one side of the body. The second detection unit is disposed on the other side of the body corresponding to the first detection unit. The control unit is disposed on the body and electrically connected to the keys, the first detection unit and the second detection unit. The first detection unit and the second detection unit jointly detect a feedback signal therebetween. When the feedback signal corresponds to an activation signal, the control unit activates the wireless keyboard.

In some embodiments, the feedback signal includes an electric field change, a magnetic field change, an electromagnetic wave signal change or an optical signal change.

In some embodiments, the control unit comprises a circuit board and a controller.

In some embodiments, the wireless keyboard further comprises a wireless transmission unit, and the wireless transmission unit is electrically connected to the control unit and transmits a wireless signal.

In some embodiments, the wireless signal is compatible with a communication protocol including Bluetooth, radio frequency, near-field communication, infrared, Wi-Fi or Zigbee.

In some embodiments, the wireless keyboard further comprises a storage unit, and the storage unit is electrically connected to the control unit and stores the activation signal.

In some embodiments, the wireless keyboard further comprises a battery, and the battery is electrically connected to the control unit and supplies power to the control unit.

In some embodiments, the battery comprises a nickel-cadmium battery, a nickel-metal hydride battery, a lithium ion battery or a lithium polymer battery.

In some embodiments, the wireless keyboard further comprises a light-emitting unit, the light-emitting unit is electrically connected to the control unit, and when the wireless keyboard is activated, the light-emitting unit is also activated.

In some embodiments, the light-emitting unit comprises a light-emitting diode, an organic light-emitting diode, a sub-millimeter light-emitting diode, or a micro-light-emitting diode.

In summary, the first detection unit and the second detection unit disposed on the opposite sides of the body can detect operation actions on the wireless keyboard. Therefore, when a user does not operate the wireless keyboard for more than a default time, the wireless keyboard can enter a sleep mode with the lowest operating power according to its default setting so as to save power. On the other hand, when the user wants to operate the wireless keyboard, the user only needs to put his hand on the keys, and the first detection unit and the second detection unit can jointly detect the feedback signal therebetween to determine whether the user wants to operate the wireless keyboard. When the feedback signal corresponds to the activation signal, the wireless keyboard will be automatically activated for the user to operate; thus, it does not require the user to switch on/off the power supply manually, and the power supply time of the wireless keyboard can be prolonged.

For this reason, the wireless keyboard according to the present utility model can save power, and does not require users to switch on/off the power supply manually, thereby achieving the purpose of facilitating life.

In order to further understand the techniques, means and effects adopted by the present utility model to achieve the predetermined objective, please refer to the following detailed description and accompanying drawings of the present utility model. It is believed that an in-depth and specific understanding of the features and characteristics of the present utility model can be obtained therefrom. How-

DESCRIPTION OF REFERENCE SIGNS IN THE FIGURES

1: wireless keyboard; 10: body; 11: key; 12: first detection unit; 13: second detection unit; 14: control unit; 15: wireless transmission unit; 16: storage unit; 17: battery; and 18: light-emitting unit.

DETAILED DESCRIPTION OF PREFERRED EMBODIMENTS

Embodiments of the present utility model will be described below using specific examples, and a person skilled in the art can easily understand other advantages and effects of the present utility model from the content disclosed in this specification. The present utility model can also be implemented or applied by means of other different specific examples, and various details in the description of the present utility model can also be modified and changed on the basis of different viewpoints and applications without departing from the spirit of the present utility model.

It should be noted that the structure, proportion, size, number of components, etc. shown in the accompanying drawings in this specification are all only used in conjunction with the content disclosed in the specification for a person skilled in the art to understand and read, and are not intended to limit the conditions under which the present utility model can be implemented, and thereby have no technical significance. Any modification of the structure, change to the proportional relationship or adjustment of the size should fall within the scope able to be covered by the technical content disclosed in the present utility model, without affecting the effect that the present utility model can produce and the purpose that can be achieved.

The technical content and detailed description of the present utility model are described below in conjunction with the drawings.

Figure 1:
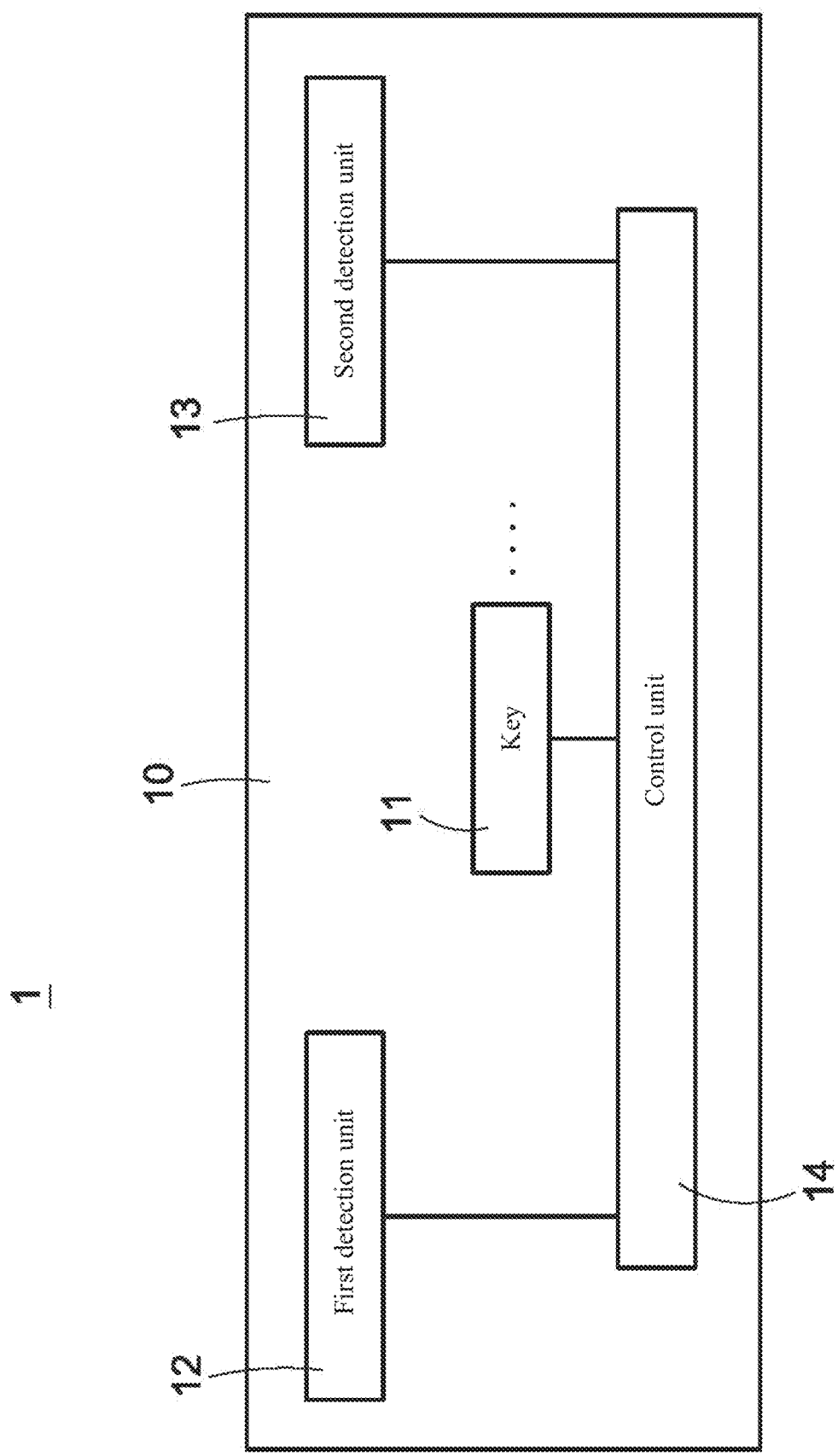
FIG. 1 is a block diagram of a first embodiment of a wireless keyboard according to the present utility model.
Figure 2:
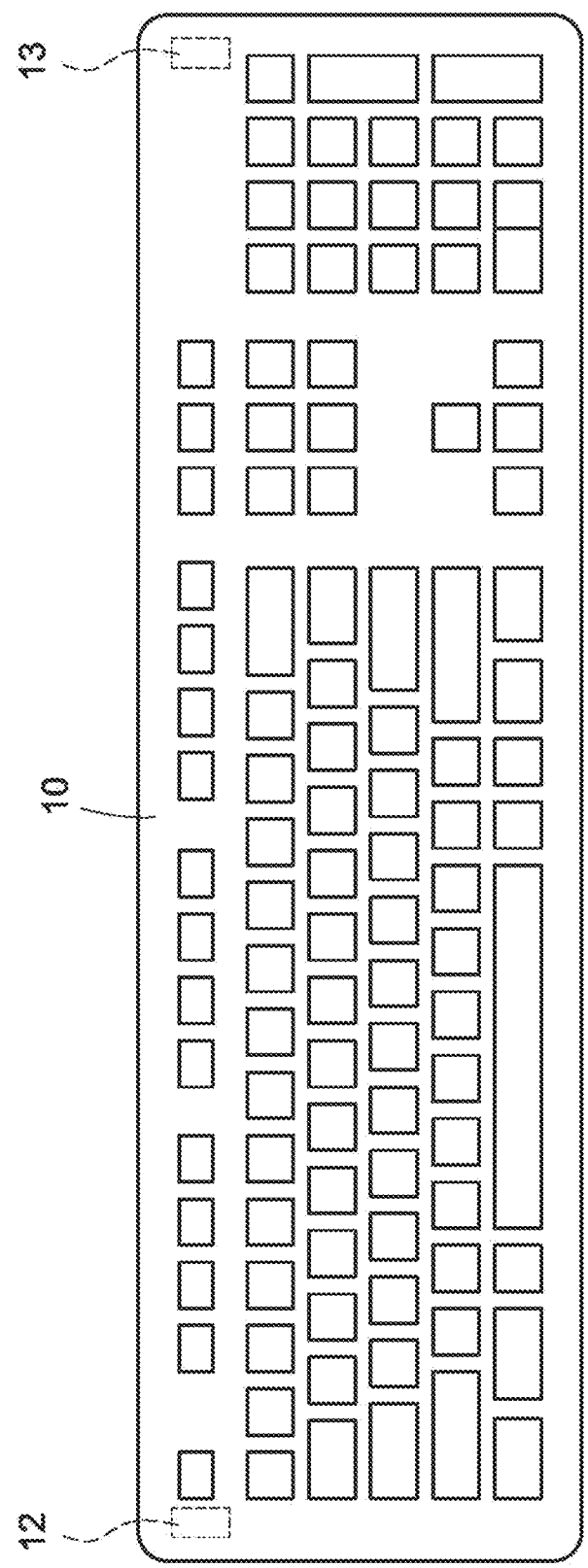
FIG. 2 is a schematic diagram of the appearance configuration of the wireless keyboard according to the present utility model.

Please refer to FIGS. 1 and 2, wherein FIG. 1 is a block diagram of a first embodiment of a wireless keyboard 1 according to the present utility model, and FIG. 2 is a schematic diagram of the appearance configuration of the wireless keyboard 1 according to the present utility model. In the first embodiment of the present utility model, the wireless keyboard 1 includes a body 10, several keys 11, a first detection unit 12, a second detection unit 13 and a control unit 14.

The body 10 may include a housing, which may be integrally molded or formed by combining several housings.

The several keys 11 are disposed on the body 10. In some embodiments, the several keys 11 may be in the form of a QWERTY arrangement, a QWERTY-like arrangement, or other non-QWERTY-like arrangements. However, the present utility model is not limited thereto.

The first detection unit 12 is disposed on one side of the body 10. The second detection unit 13 is disposed on the other side of the body 10 corresponding to the first detection unit 12. In some embodiments, several keys 11 are disposed between the first detection unit 12 and the second detection unit 13, the first detection unit 12 and the second detection unit 13 may each be an electric field generator, a magnetic field generator, an electromagnetic wave signal generator or an optical signal generator, and the first detection unit 12 and the second detection unit 13 are used to detect whether a user is currently operating the several keys 11.

In the first embodiment of the present utility model, the first detection unit 12 and the second detection unit 13 jointly detect a feedback signal therebetween. The feedback signal may include an electric field change, a magnetic field change, an electromagnetic wave signal change or an optical signal change. In other words, the first detection unit 12 and the second detection unit 13 can generate an electric field, a magnetic field, an electromagnetic wave signal or an optical signal, and detect the electric field change, the magnetic field change, the electromagnetic wave signal change or the optical signal change. In some embodiments, the change represents an increase, decrease, or other possible change in the signal.

The control unit 14 is disposed on the body 10 and is electrically connected to the keys 11, the first detection unit 12 and the second detection unit 13. In some embodiments, the control unit 14 includes a circuit board and a controller. The controller may include one of a microcontroller (MCU), a microprocessor (MPU), a central processing unit (CPU), an application-specific integrated circuit (ASIC) or a system-on-chip (SoC). The microcontroller may also include a circuit board based on Arduino machine code architecture. The system-on-chip may be a Raspberry Pi, and its model may be Type 1A, Type 1A+, Type 1B, Type 1B+, Type 2B, Type 3B, Type 3B+, Type 3A+, or Type 4B. However, the present utility model is not limited thereto.

In the first embodiment of the present utility model, when the feedback signal jointly detected by the first detection unit 12 and the second detection unit 13 corresponds to an activation signal, the control unit 14 activates the wireless keyboard 1.

Therefore, when the user is using the wireless keyboard 1 according to the present utility model, the feedback signal received by the first detection unit 12 and the second detection unit 13 disposed on opposite sides of the body may change continuously, indicating that the user is performing an operating action. In some embodiments, if the user continuously uses the wireless keyboard 1, the control unit 14 may also temporarily turn off the first detection unit 12 and the second detection unit 13, and turn them on intermittently at a default time to detect whether the user is still using the wireless keyboard 1, thereby allowing further power savings. However, this is not limiting.

When the user does not operate the wireless keyboard 1 for more than a default time, the feedback signal between the first detection unit 12 and the second detection unit 13 will become stable. Therefore, the control unit 14 can make the wireless keyboard 1 enter a sleep mode with the lowest operating power according to its default setting, so as to save power. It should be noted that the preset time can be set by a manufacturer or by the user.

On the other hand, when the user wants to operate the wireless keyboard 1, the user only needs to put his hand on the keys 11. At this time, because the user's hand will change (or disturb) the feedback signal, the feedback signal between the first detection unit 12 and the second detection unit 13 detected by them becomes unstable. When the change (such as default time, frequency, number of times, signal strength or other conditions) of the feedback signal corresponds to the activation signal, the first detection unit 12 and the second detection unit 13 determine that the user is performing an operating action. At this time, the control unit 14 will release the wireless keyboard 1 from the sleep mode, and automatically activate the wireless keyboard 1 in a normal power supply mode, so that the user can smoothly perform normal operations on the wireless keyboard 1.

In summary, in the present utility model, since the first detection unit 12 and the second detection unit 13 disposed on the opposite sides of the body 10 can detect operation actions on the wireless keyboard 1, when the user does not operate the wireless keyboard 1 for more than a default time, the wireless keyboard can enter the sleep mode with the lowest operating power according to its default setting, so as to save power. On the other hand, when the user wants to operate the wireless keyboard 1, the user only needs to put his hand 11 on the keys, and the first detection unit 12 and the second detection unit 13 can jointly detect the feedback signal therebetween to determine whether the user wants to operate the wireless keyboard 1. When the feedback signal corresponds to the activation signal, the wireless keyboard 1 will be automatically activated for the user to operate. Thereby, it does not require the user to switch on/off the power supply manually, and the power supply time of the wireless keyboard 1 can be prolonged.

Figure 3:
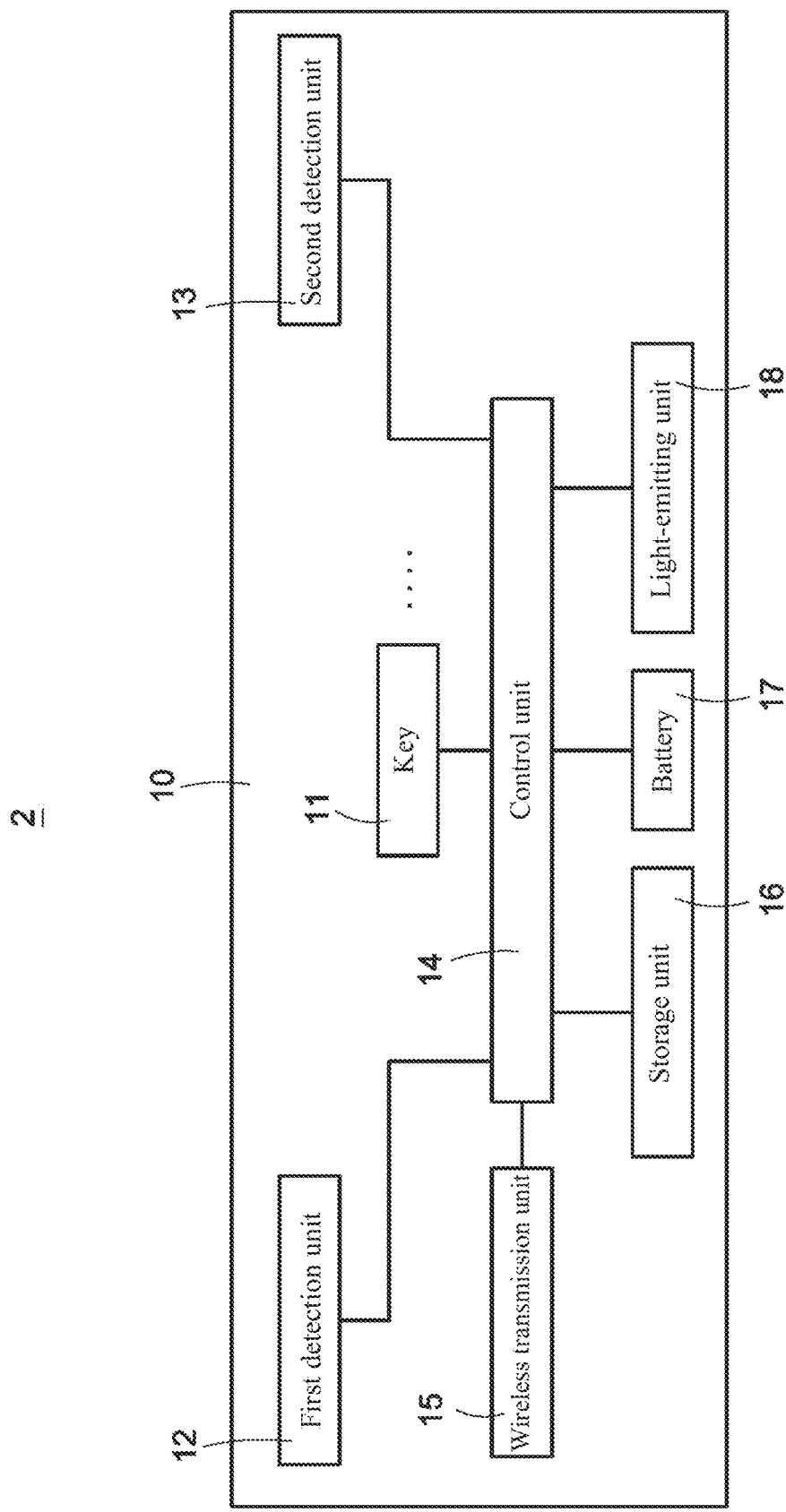
FIG. 3 is a block diagram of a second embodiment of a wireless keyboard according to the present utility model.

Please refer to FIGS. 2 and 3, wherein FIG. 2 is a schematic diagram of the appearance configuration of the wireless keyboard according to the present utility model, and FIG. 3 is a system architecture diagram of a second embodiment of the wireless keyboard according to the present utility model. The second embodiment of the present utility model is substantially the same as the aforementioned first embodiment, but the wireless keyboard 2 further includes a wireless transmission unit 15, a storage unit 16, a battery 17 and a light-emitting unit 18.

The wireless transmission unit 15 is electrically connected to the control unit 14, and transmits a wireless signal with a computing host (such as a desktop computer, a notebook computer, a tablet computer, etc.). In some embodiments, the wireless signal is compatible with a communication protocol including Bluetooth (Bluetooth), radio frequency (RF), near-field communication (NFC), infrared (IR), Wi-Fi or Zigbee. However, the present utility model is not limited thereto.

The storage unit 16 is electrically connected to the control unit 14, and stores the activation signal. In some embodiments, the storage unit 16 includes a storage medium such as NAND Flash or EEPROM. It should be noted that the activation signal (such as default time, frequency, number of times, signal strength or other conditions) can be set by the manufacturer or by the user, so as to allow the user to adjust the sensitivity of waking up the wireless keyboard 1 or reduce the false positive rate. It can be adjusted according to users of different ages (for example, for the elderly, the frequency and the number of times need to be reduced), or even people with physical disabilities. However, the present utility model is not limited thereto. When the wireless keyboard 1 is activated in the normal power supply mode, the control unit 14 does not read the activation signal; and when the wireless keyboard 1 enters the sleep mode, the control unit 14 reads the activation signal, so as to determine, by comparison, whether the change in the feedback signal corresponds to the activation signal. The battery 17 is electrically connected to the control unit 14 and supplies power to the control unit 14. In some embodiments, the battery 17 includes a nickel-cadmium battery, a nickel-metal hydride battery, a lithium ion battery, or a lithium polymer battery. However, the present utility model is not limited thereto.

The light-emitting unit 18 is electrically connected to the control unit 14, and when the wireless keyboard 2 is activated, the light-emitting unit is 18 also activated. In some embodiments, the light-emitting unit 18 includes a light-emitting diode (LED), an organic light-emitting diode (OLED), a sub-millimeter light-emitting diode (Mini LED), a micro light-emitting diode (Micro LED), or the like. However, the present utility model is not limited thereto.

Therefore, when the user is using the wireless keyboard 2 of the present utility model, the feedback signal received by the first detection unit 12 and the second detection unit 13 disposed on opposite sides of the body may change continuously, indicating that the user is performing an operating action. In some embodiments, if the user continuously uses the wireless keyboard 2, the control unit 14 may also temporarily turn off the first detection unit 12 and the second detection unit 13, and turn them on intermittently at a default time to detect whether the user is still using the wireless keyboard 2, thereby achieving further power savings. However, this is not limiting.

When the user does not operate the wireless keyboard 2 for more than a default time, the feedback signal between the first detection unit 12 and the second detection unit 13 will become stable. Therefore, the control unit 14 can make the wireless keyboard 2 enter a sleep mode with the lowest operating power according to its default setting, so as to save the power of the battery 17. It should be noted that the preset time can be set by a manufacturer or by the user.

On the other hand, when the user wants to operate the wireless keyboard 2, the user only needs to put his hand on the keys 11. At this time, because the user's hand will change (or disturb) the feedback signal, the feedback signal between the first detection unit 12 and the second detection unit 13 detected by them becomes unstable. When the change (such as in default time, frequency, number of times, signal strength or other conditions) of the feedback signal corresponds to the activation signal, the first detection unit 12 and the second detection unit 13 determine that the user is performing an operating action. At this time, the control unit 14 will release the wireless keyboard 2 from the sleep mode, and automatically activate the wireless keyboard 2 in a normal power supply mode, so that the user can smoothly perform normal operations on the wireless keyboard 2, so as to transmit a wireless signal to a computing host through the wireless transmission unit 15. Moreover, when the wireless keyboard 2 is activated, the light-emitting unit 18 can also be activated.

In summary, in the present utility model, since the first detection unit 12 and the second detection unit 13 disposed on the opposite sides of the body 10 can detect operation actions on the wireless keyboard 2, when the user does not operate the wireless keyboard 2 for more than a default time, the wireless keyboard 2 can enter a sleep mode with the lowest operating power according to its default setting so as to save power. On the other hand, when the user wants to operate the wireless keyboard 2, the user only needs to put his hand 11 on the keys, and the first detection unit 12 and the second detection unit 13 can jointly detect the feedback signal therebetween to determine whether the user wants to operate the wireless keyboard 2. When the feedback signal corresponds to the activation signal, the wireless keyboard 2 will be automatically activated for the user to operate. Thus, it does not require the user to switch on/off the power supply manually, and the power supply time of the wireless keyboard 2 can be prolonged.

For this reason, the wireless keyboards 1 and 2 according to the present utility model can save power, and do not require users to switch on/off the power supply manually, thereby achieving the purpose of facilitating life.

The detailed description and drawings of the preferred specific embodiments of the present utility model only are described above, but the features of the present utility model are not limited thereto. They are not intended to limit the present utility model. The entire scope of the present utility model should be based on the attached scope of the patent application. All embodiments that are in line with the spirit of the scope of the present utility model and similar variations thereof shall be included in the scope of the present utility model. Any changes or modifications that can be easily conceived of by any person skilled in the field of the present utility model are able to be covered by the patent scope of this solution.

The invention claimed is:

1. A wireless keyboard, comprising:
   a body;
   a plurality of keys disposed on the body;
   a first detection unit disposed on one side of the body;
   a second detection unit disposed on the other side of the body corresponding to the first detection unit; and
   a control unit disposed on the body and electrically connected to the plurality of keys, the first detection unit and the second detection unit;
   wherein the first detection unit and the second detection unit jointly detect a feedback signal therebetween based on a user touching the plurality of keys located between the first detection unit and the second detection unit, and upon detecting that the feedback signal corresponds to an activation signal, the control unit automatically activates the wireless keyboard.

2. The wireless keyboard according to claim 1, wherein the feedback signal comprises an electric field change, a magnetic field change, an electromagnetic wave signal change or an optical signal change.

3. The wireless keyboard according to claim 1, wherein the control unit comprises a circuit board and a controller.

4. The wireless keyboard according to claim 1, further comprising a wireless transmission unit electrically connected to the control unit.

5. The wireless keyboard according to claim 4, wherein a wireless signal transmitted by the wireless transmission unit is compatible with a communication protocol including Bluetooth, near-field communication, Wi-Fi or Zigbee.

6. The wireless keyboard according to claim 1, further comprising: a storage unit electrically connected to the control unit and storing the activation signal.

7. The wireless keyboard according to claim 1, further comprising: a battery electrically connected to the control unit and supplying power to the control unit.

8. The wireless keyboard according to claim 7, wherein the battery comprises a nickel-cadmium battery, a nickel-metal hydride battery, a lithium ion battery or a lithium polymer battery.

9. The wireless keyboard according to claim 1, further comprising:
   a light-emitting unit electrically connected to the control unit, wherein when the wireless keyboard is activated, the light-emitting unit is also activated.

10. The wireless keyboard according to claim 9, wherein the light-emitting unit comprises a light-emitting diode, an organic light-emitting diode, a sub-millimeter light-emitting diode, or a micro-light-emitting diode.

* * * * *